United States Patent
McAfee et al.

(10) Patent No.: US 9,110,927 B2
(45) Date of Patent: Aug. 18, 2015

(54) METHOD AND APPARATUS FOR ORGANIZING DIGITAL PHOTOGRAPHS

(75) Inventors: Randolph Preston McAfee, San Marino, CA (US); Shanmugasundaram Ravikumar, Berkeley, CA (US)

(73) Assignee: YAHOO! INC., Sunnyvale, CA (US)

( * ) Notice: Subject to any disclaimer, the term of this patent is extended or adjusted under 35 U.S.C. 154(b) by 1240 days.

(21) Appl. No.: 12/277,689

(22) Filed: Nov. 25, 2008

(65) Prior Publication Data

US 2010/0128987 A1 May 27, 2010

(51) Int. Cl.
G06K 9/62 (2006.01)
G06F 17/30 (2006.01)

(52) U.S. Cl.
CPC ...... *G06F 17/30265* (2013.01); *G06F 17/3028* (2013.01)

(58) Field of Classification Search
USPC .................................. 382/305, 224
See application file for complete search history.

(56) References Cited

U.S. PATENT DOCUMENTS

| | | |
|---|---|---|
| 6,437,797 B1 | 8/2002 | Ota |
| 6,499,016 B1 | 12/2002 | Anderson |
| 6,914,625 B1 * | 7/2005 | Anderson et al. .......... 348/222.1 |
| 6,973,201 B1 | 12/2005 | Colmenarez et al. |
| 6,993,180 B2 * | 1/2006 | Sun et al. ...................... 382/165 |
| 7,010,751 B2 | 3/2006 | Shneiderman |
| 7,076,496 B1 | 7/2006 | Ruizandrade |
| 7,283,650 B1 | 10/2007 | Sharma et al. |
| 7,415,662 B2 | 8/2008 | Rothmuller et al. |
| 7,454,077 B1 | 11/2008 | MacKenzie et al. |
| 7,634,115 B2 | 12/2009 | Ryu |
| 7,686,682 B2 | 3/2010 | Diakopoulos et al. |
| 7,734,589 B1 | 6/2010 | Svendsen |
| 7,796,779 B1 * | 9/2010 | Strong et al. .................. 382/100 |
| 7,855,510 B2 | 12/2010 | Ohmura et al. |
| 8,015,490 B2 * | 9/2011 | Ogikubo ....................... 715/716 |

(Continued)

FOREIGN PATENT DOCUMENTS

JP 2006190007 A * 7/2006

OTHER PUBLICATIONS

Ahern, S. et al.(2004) "ZoneTag: Desigining Context-Aware Mobile Media Captur to incerase Paticipation,"Mobile Systems, Applications and Services; MobiSys2004; Boston; MA 2004; 3 pages.

(Continued)

*Primary Examiner* — Wenpeng Chen
(74) *Attorney, Agent, or Firm* — James J. DeCarlo; Greenberg Traurig, LLP

(57) ABSTRACT

A method and system for organizing digital photographs is disclosed. A plurality of digital photographs are obtained. Each digital photograph in the plurality is analyzed to obtain metadata related to the digital photograph and/or photograph content information related to the digital photograph. The metadata and/or the photograph content information is then analyzed. The plurality of digital photographs are automatically organized into clusters. Each cluster is associated with one or more predetermined cluster parameter. Each cluster parameter is associated with a metadata item. The digital photographs are then displayed (e.g., in a web page) on a computing device in accordance with the cluster parameter (s). One or more of the digital photographs are reorganized into a different cluster each time additional metadata related to the one or more digital photographs is received.

18 Claims, 5 Drawing Sheets

(56) References Cited

U.S. PATENT DOCUMENTS

| | | | |
|---|---|---|---|
| 8,254,684 | B2 | 8/2012 | Ruta |
| 2003/0229628 | A1 | 12/2003 | Banerjee et al. |
| 2004/0177319 | A1* | 9/2004 | Horn .......................... 715/501.1 |
| 2005/0024513 | A1* | 2/2005 | Hayashi et al. ........... 348/333.01 |
| 2005/0044066 | A1* | 2/2005 | Hooper et al. ..................... 707/3 |
| 2005/0060299 | A1* | 3/2005 | Filley et al. ........................ 707/3 |
| 2006/0050166 | A1* | 3/2006 | Sonoda et al. ........... 348/333.01 |
| 2006/0157551 | A1 | 7/2006 | Kim et al. |
| 2006/0193538 | A1* | 8/2006 | Vronay et al. ................. 382/305 |
| 2006/0195475 | A1* | 8/2006 | Logan et al. ................ 707/104.1 |
| 2006/0198559 | A1* | 9/2006 | Manico et al. ................. 382/305 |
| 2006/0242178 | A1 | 10/2006 | Butterfield et al. |
| 2006/0271277 | A1 | 11/2006 | Hu et al. |
| 2006/0274978 | A1 | 12/2006 | Fududa et al. |
| 2007/0255695 | A1 | 11/2007 | Hu et al. |
| 2008/0013940 | A1* | 1/2008 | Jung et al. ........................ 396/78 |
| 2008/0126191 | A1 | 5/2008 | Schiavi |
| 2008/0126961 | A1 | 5/2008 | Naaman et al. |
| 2008/0205789 | A1* | 8/2008 | Ten Kate et al. .............. 382/284 |
| 2008/0278438 | A1 | 11/2008 | Brown et al. |
| 2008/0292196 | A1* | 11/2008 | Jain et al. ...................... 382/225 |
| 2009/0089322 | A1 | 4/2009 | Naaman |
| 2009/0157696 | A1* | 6/2009 | Mikawa et al. ................. 707/10 |
| 2009/0313558 | A1* | 12/2009 | Yariv et al. ..................... 715/760 |
| 2010/0058163 | A1* | 3/2010 | Garcia-Molina et al. ...... 715/220 |
| 2010/0158471 | A1* | 6/2010 | Ogikubo ........................... 386/52 |

OTHER PUBLICATIONS

Anonymous; (2006) "ZONETAG Photos FAQ/location Tags in Flickr,"located at http://zonetag.reearch.yahoo.com/fag_location.php last visited on Feb. 10, 2009; 3 pages.

Anonymous (2006); "ZONETAG, Photos: FAQ/ZoneTag Suggested Tags," located at http://zonetag.reserach.yahoo.com/fag_tagging.php last visited on Feb. 10, 2009; 2 pages.

Anonymous (2006) "ZONETAG Photos,"located at http://zonetag.research.yahoo.com/ last visited on Feb. 10, 2009; 2 pages.

Anonymous (2006) "ZoneTag Highlights," located at http://zonetag.research.yahoo.com/learnmore.php/ last visited on Feb. 10, 2009; 2 pages.

Naaman, et al.; (Jul.-Sep. 2008); "ZoneTag's Collaborative Tag Suggestions: What is This Person Doing in My Phone?" IEEE Computer Society; pp. 34-40.

U.S. Appl. No. 11/864;828, filed on Sep. 28, 2007; Namaan.

U.S. Appl. No. 12/042,306, filed on Mar. 4, 2008; Slaney et al.

U.S. Appl. No. 12/347,882, filed on Dec. 31, 2008; Sahni, et al.

Notification of Transmittal of the International Search Report and The Written Opinion of the International Searching Authority, Or The Declaration; (PCT/US2008/087790) dated Jul. 31, 2009; 9 pages.

International Preliminary Report on Patentability (PCT/US2008/087790) mailed Jul. 15, 2010; 5 pages.

\* cited by examiner

US 9,110,927 B2

METHOD AND APPARATUS FOR ORGANIZING DIGITAL PHOTOGRAPHS

FIELD

The present disclosure relates to digital photographs, and more specifically to organizing digital photographs.

BACKGROUND

Computing devices such as digital cameras or cellular telephones are often used to take digital pictures. These digital photographs are typically stored on a computer. Frequently, a user of the digital camera takes many pictures over a period of time and then stores these digital photographs on the computer without organizing the digital photographs. This process may be repeated any number of times, resulting in many digital photographs being stored on the user's computer in a disorganized fashion.

It is often extremely time consuming to organize digital photographs, especially in light of the volume of digital photographs taken and then stored on a computer. There remains a need to facilitate the organization of digital photographs.

SUMMARY

A method and system for organizing digital photographs is disclosed. In one aspect, a plurality of digital photographs are obtained (e.g., from a digital camera or from memory). Each digital photograph in the plurality is analyzed to obtain items of metadata (e.g., date on which a digital photograph was taken) and/or photograph content information related to the digital photograph. The metadata items and/or the photograph content information is then analyzed. The plurality of digital photographs are automatically organized into clusters. Each cluster is associated with one or more cluster parameter, such as a time period. Each cluster parameter is related to one or more metadata item. The digital photographs are then displayed (e.g., in a web page) on a computing device in accordance with the cluster parameter(s). Additional metadata may also be received. One or more of the digital photographs can be reorganized into a different cluster when additional metadata related to the one or more digital photographs is received.

In one embodiment, the automatically organizing digital photographs into clusters includes automatically organizing each of the digital photographs by one or more of date, time that the digital photograph is stored on the one or more processors, time the digital photograph was taken, and event. In one embodiment, the analyzing each digital photograph further includes performing image recognition on the digital photograph to obtain photograph content information. A tag can be assigned to one or more of the digital photographs and can be used to locate one or more digital photographs. In one embodiment, a location associated with a digital photograph is obtained, such as by obtaining Global Positioning System (GPS) coordinates associated with the device used to take the digital photograph.

These and other aspects and embodiments will be apparent to those of ordinary skill in the art by reference to the following detailed description and the accompanying drawings.

DESCRIPTION OF EMBODIMENTS

Figure 1:
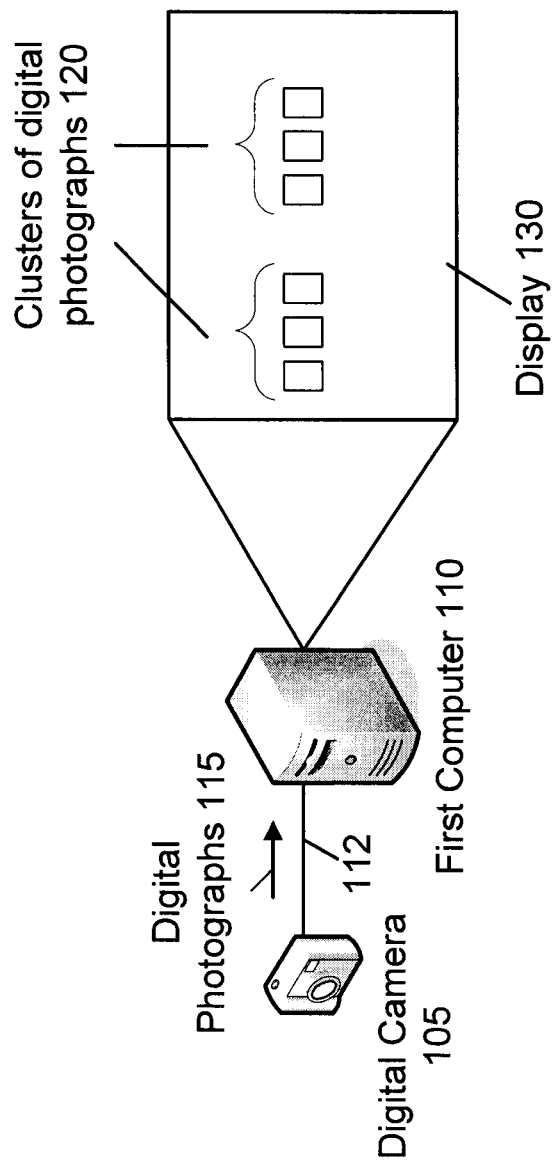
FIG. 1 is a block diagram of a computer organizing digital photographs downloaded from a digital camera in accordance with an embodiment of the present invention.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the invention that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

In one embodiment, and referring to FIG. 1, a user of a digital camera 105 connects the digital camera 105 to a first computer 110 (via a cable 112 or wirelessly) in order to download one or more digital photographs 115 from the digital camera 105 to the first computer 110. For purposes of this disclosure, a computer or computing device such as the first computer 110 includes a processor and memory for storing and executing program code, data and software which may be stored or read from computer readable media. Computers can be provided with operating systems that allow the execution of software applications in order to manipulate data. Personal computers, servers, personal digital assistants (PDAs), wireless devices, cellular telephones, internet appliances, media players, home theater systems, and media centers are several non-limiting examples of computers.

For the purposes of this disclosure, a computer readable medium is a medium that stores computer data in machine readable form. By way of example, and not limitation, a computer readable medium can comprise computer storage media for tangibly storing data, as well as communication media, methods or signals. Computer storage media for tangible storage includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer or processor.

In one embodiment, each digital photograph in digital photographs 115 includes metadata related to the corresponding digital photograph. Metadata associated with a digital photograph is information about the digital photograph, such as, for example, the date on which the digital photograph was taken or information about the location at which the digital photograph was taken (i.e., geolocation) (e.g., GPS coordinates). In one embodiment, the metadata associated with a digital photograph was information that the digital camera 105 associated with the digital photograph. In one embodiment, the first computer 110 automatically organizes the received digital photographs 115 into one or more clusters 120. As described in more detail below, each cluster 120 includes zero or more digital photographs having particular metadata. Each cluster is associated with cluster parameters. In a further embodiment, the first computer 110 organizes the received digital photographs 115 along with one or more stored digital photographs. In one embodiment, the first computer 105 displays the one or more clusters 120 on a display 130, such as a computer monitor, television, PDA screen or cellular telephone screen.

Figure 2:
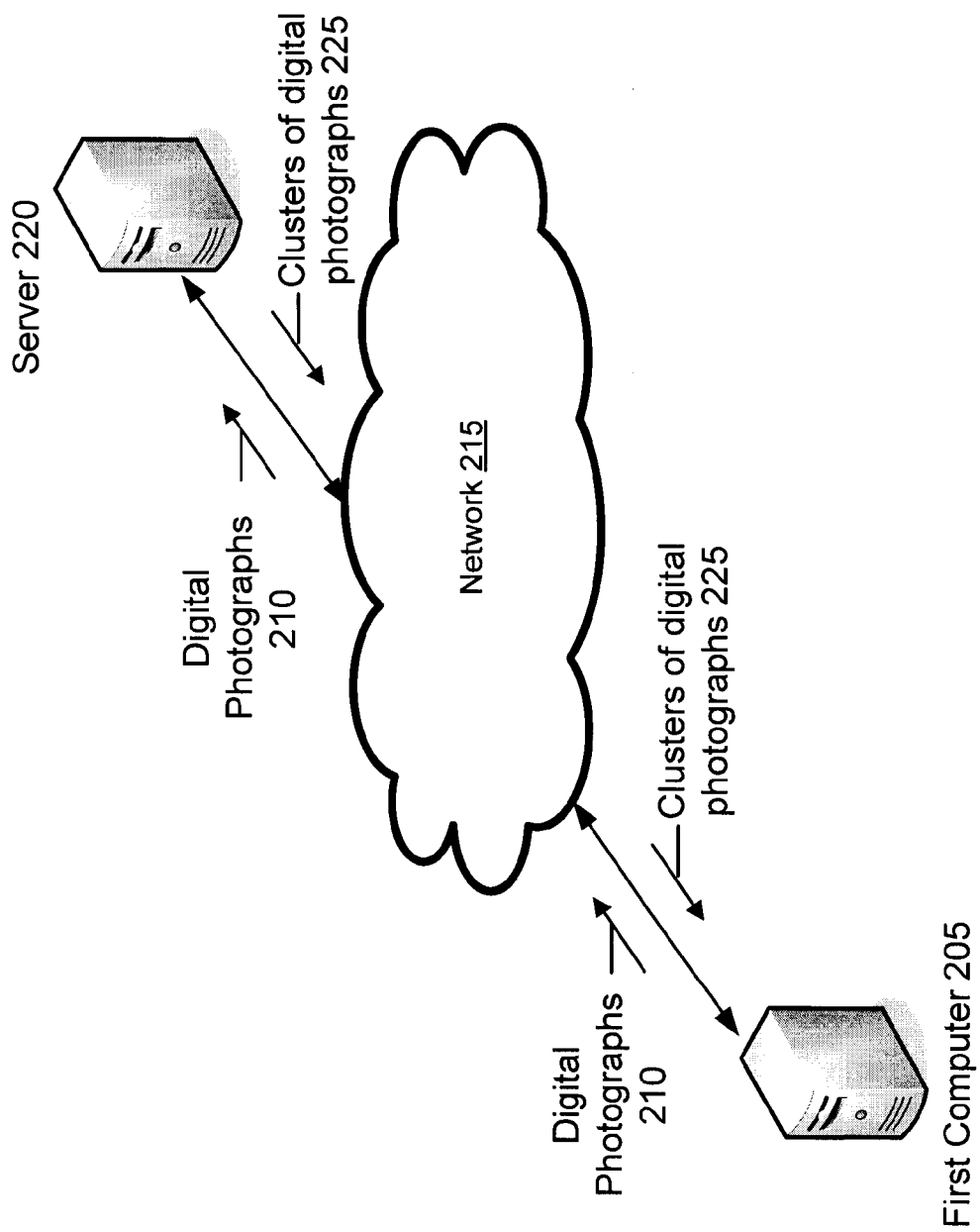
FIG. 2 is a block diagram illustrating a first computer transmitting digital photographs to a server over a network in accordance with an embodiment of the present invention.

Referring to FIG. 2, in one embodiment a first computer 205 (e.g., a laptop computer, a desktop computer, or a PDA) transmits one or more stored digital photograph 210 over a network 215 such as the Internet to a server 220. This transmission may occur via a cable or wirelessly. This transmission may occur, for example, periodically, when new digital photographs are downloaded from a digital camera to the first computer 205, at predetermined times, and/or when a user selects the download to occur. The server 220 can then organize the digital photographs 210 by categorizing each digital photograph into one or more clusters. This organizing is based on cluster parameters associated with the cluster, metadata associated with the digital photograph, and/or photograph content information, or information associated with the content of the digital photograph (e.g., obtained via image recognition software). In one embodiment, the server 220 organizes the received digital photographs 210 along with digital photographs that the server 220 is storing. In one embodiment, the server 220 transmits clusters of digital photographs 225 over the network 215 to the first computer 205 for display. For example, the first computer 205 may display the clusters of digital photographs 225 on a web page in an organized fashion.

As described in more detail below, after the first computer 205 displays the digital photographs as clusters 225, the user of the first computer 205 can further organize the one or more digital photographs. For example, the user of the first computer 205 can use the mouse associated with the first computer 205 to drag one or more digital photographs from a first cluster to a second cluster.

Figure 3:
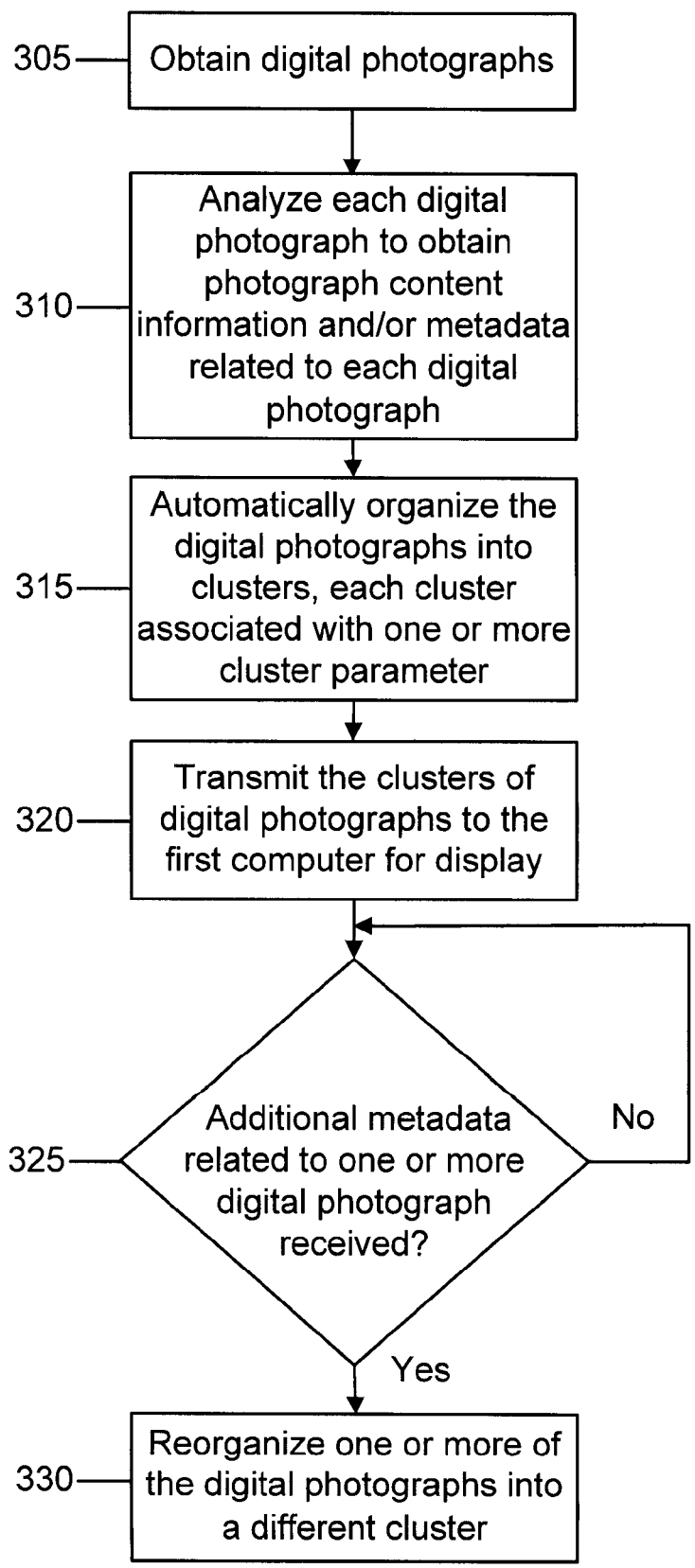
FIG. 3 is a flowchart of the steps performed by a computer to organize digital photographs in accordance with an embodiment of the present invention.

FIG. 3 shows a flowchart illustrating the steps performed by server 220, first computer 205, or first computer 105 to organize digital photographs. The digital photographs are obtained in step 305. In one embodiment, the digital photographs are received from a digital camera 105. Alternatively, the digital photographs are retrieved from (internal or external) memory, such as a hard drive. In one embodiment, each digital photograph is analyzed in step 310 to obtain metadata related to each digital photograph. As described above, metadata may include, for example, the date on which the digital photograph was taken, the location at which the digital photograph was taken, or any other data associated with the digital photograph. In one embodiment, each digital photograph is analyzed to obtain photograph content information related to the digital photograph. For example, each digital photograph is analyzed using image recognition software to determine whether a photograph has a particular image in the photograph, such as a birthday cake or a particular person's face.

The digital photographs are then automatically organized into one or more clusters in step 315. In one embodiment, the clusters are formed in step 315. Alternatively, the clusters were formed previously. Each of the clusters is associated with predetermined cluster parameters. Each cluster parameter is related to one or more metadata item. For example, a cluster parameter may be a particular time period upon which digital photographs were taken. The cluster parameter is related to a metadata item associated with a digital photograph because only a digital photograph having a metadata item corresponding to that time period will be placed in that specific cluster.

For example, a cluster may be formed for digital photographs taken between two time periods or for digital photographs having a particular image in it (e.g., a particular person or item). In one embodiment, the digital photographs are organized by event or person, such as grouping all digital photographs having a particular family member together into a cluster. In one embodiment, the cluster parameter associated with a cluster includes a maximum number of digital photographs for the cluster. In one embodiment, if the cluster contains more digital photographs than the maximum number associated with that cluster, the cluster is divided into two or more clusters having additional cluster parameters. For example, if 280 digital photographs were taken between Jun. 13-19, 2008, and if the maximum number associated with the cluster corresponding with that time frame is 200, then the cluster contains 80 more digital photographs than is allowed. In this situation, the cluster can be subdivided into days, or if there are too many in a particular day, into hours.

In one embodiment, the cluster parameter(s) associated with a cluster is selected by the user of the first computer 110, 205. For example, a user may select that a cluster will correspond with a date upon which the digital photograph was taken of between May 1, 2008 and May 31, 2008. This cluster will then contain digital photographs that were taken between these two dates. Specifically, digital photographs taken between these two dates will automatically be placed in that cluster.

In one embodiment, a cluster is associated with a predetermined cluster parameter relating to all digital photographs having a birthday cake in the photograph and taken between May 1, 2008 and May 31, 2008. This cluster may, for instance, correspond with digital photographs taken during a birthday party in May, 2008.

The clusters are then transmitted to the first computer 110, 205 for display, such as via a web page, in step 320. In one embodiment, thumbnails of the digital photographs are transmitted to the first computer 110, 205 for display in step 320.

In one embodiment, the first computer 110, 205 (or server 220) determines, in step 325, whether additional metadata related to one or more digital photograph is received. For example, the user of the first computer 110, 205 can right click a digital photograph using his or her computer mouse to display additional metadata that can be selected for that digital photograph. In one embodiment, if additional metadata is selected for a digital photograph, the digital photograph is reorganized into a different cluster (step 330) based on the additional metadata.

In one embodiment, a caption can be added to one or more of the digital photographs and displayed below the digital photograph. The caption can describe the digital photograph and can be one or more words that a user inputs. In one embodiment, the user of the first computer 110, 205 can change the caption at any time. The first computer 110, 205 can also receive instructions to delete one or more digital photograph from a cluster or crop a digital photograph. A tag may also be assigned to a digital photograph (e.g., by the user). The tag can then be used to find the digital photograph from many digital photographs.

Figure 4:
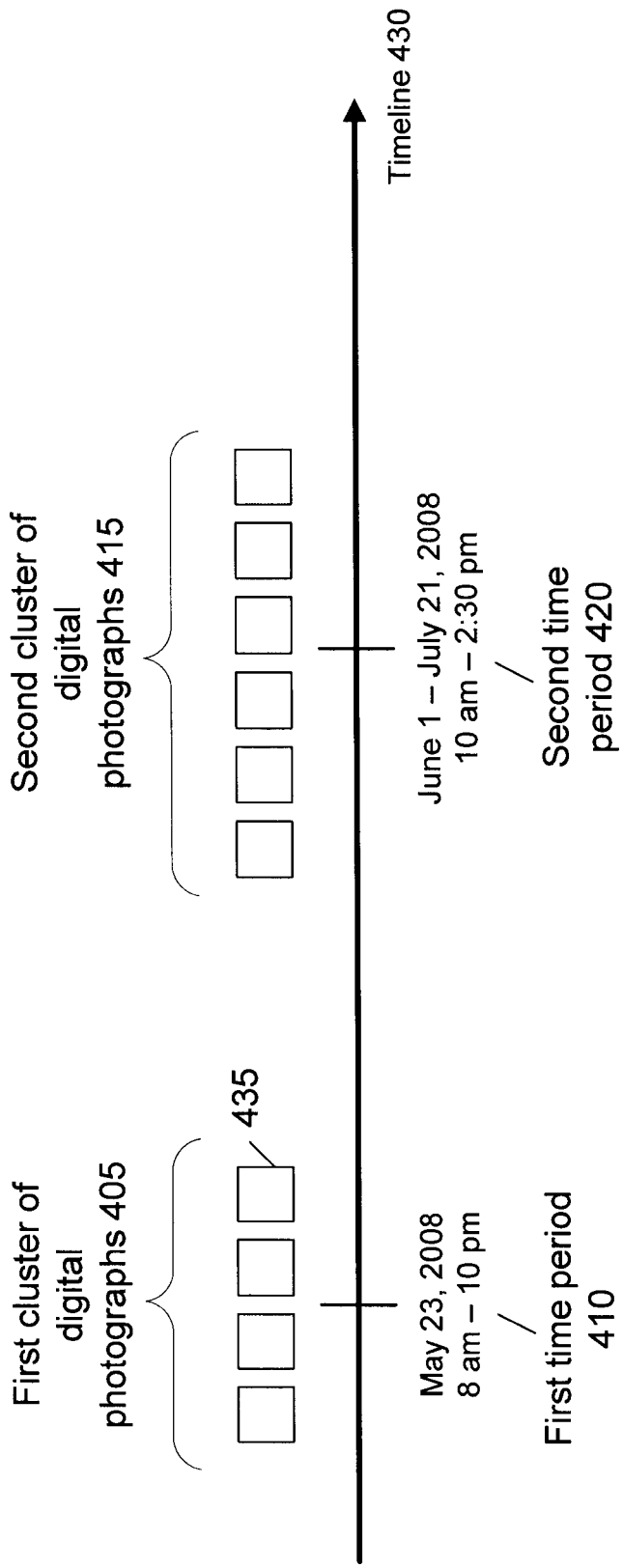
FIG. 4 is a block diagram illustrating two clusters of digital photographs in accordance with an embodiment of the present invention.

FIG. 4 shows a block diagram of digital photographs organized into two different clusters. The clusters are associated with time periods as cluster parameters. Specifically, a first cluster of digital photographs 405 corresponds with digital photographs taken during a first time period 410 (May 23, 2008, between 8 am-10 pm) and a second cluster of digital photographs 415 corresponds with digital photographs taken during a second time period 420 (Jun. 1-Jul. 21, 2008, between 10 am-2:30 pm). Each cluster 405, 415 is separated along timeline 430 so that the digital photographs in each cluster can be distinguished.

In one embodiment, a digital photograph such as digital photograph 435 can be moved by the user from the first cluster 405 to the second cluster 415. Further, digital photograph 435 can be automatically reorganized into the second cluster 415, such as after the user provides additional metadata about the digital photograph 435. In one embodiment, the additional metadata associated with the digital photograph 435 is that the digital photograph 435 was taken during the second time period 420.

In one embodiment, a user can provide instructions to the first computer 110, 205 to define a new cluster, disregarding the metadata items. In a further embodiment, the user can move one or more digital photographs into the new cluster (e.g., disregarding metadata items). In another embodiment, a user can rearrange the digital photographs in one or more clusters (e.g., disregarding metadata items).

In one embodiment, a user of the first computer 110, 205 can create one or more user templates corresponding with one or more clusters. A user template can be, for example, a first cluster associated with digital photographs having a particular family member and a second cluster associated with digital photographs taken between Jun. 1, 2008 and Jul. 1, 2008. In a further embodiment, a template marketplace can exist where people sell their templates.

Video can also be received by the first computer 110, 205 or server 220. In one embodiment, the video are handled like images.

Figure 5:
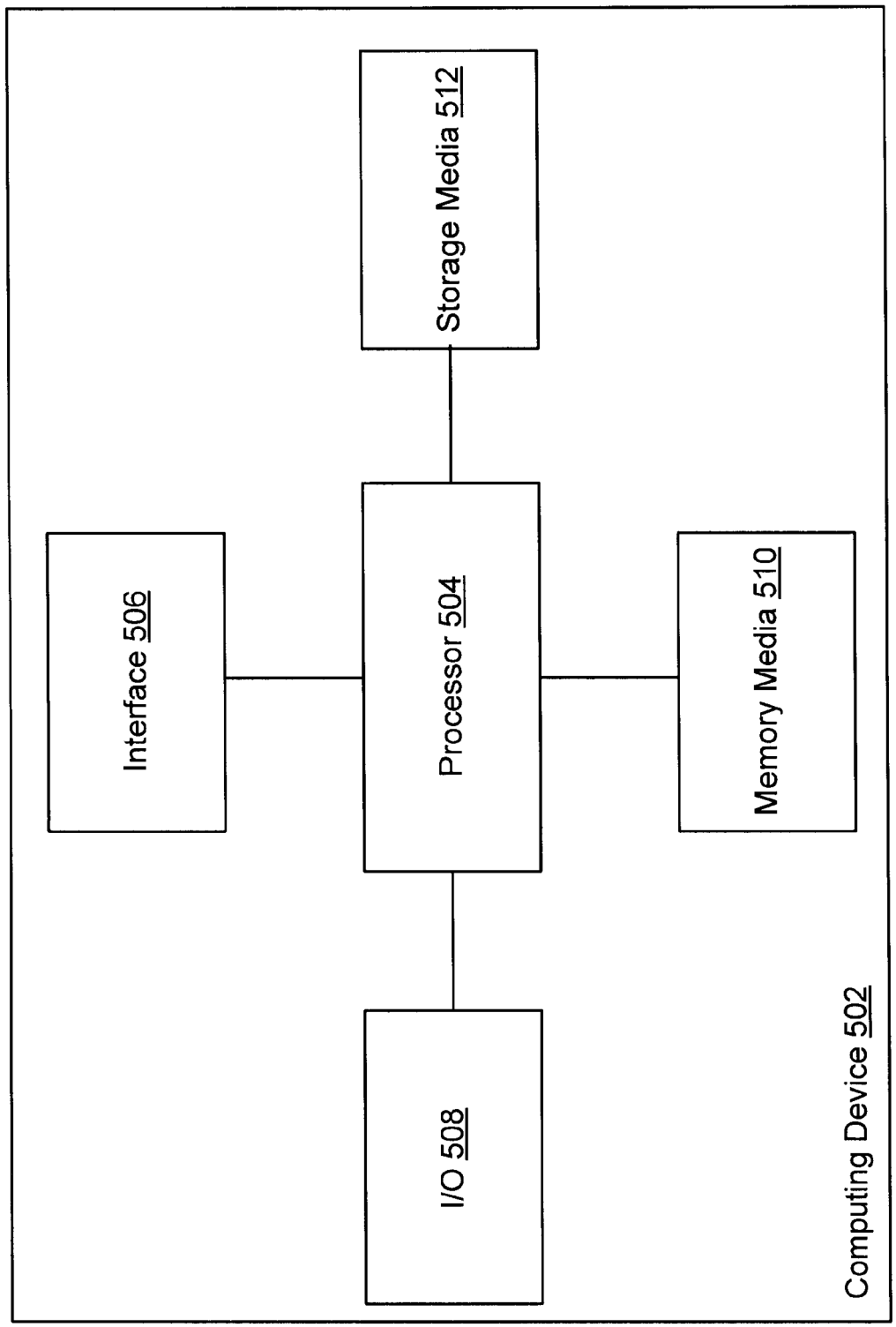
FIG. 5 is a block diagram of a computer in accordance with an embodiment of the present invention.

The description herewith describes the present invention in terms of the processing steps required to implement an embodiment of the invention. These steps can be performed by an appropriately programmed computing device or computer, the configuration of which is well known in the art. An appropriate computing device can be implemented, for example, using well known computer processors, memory units, storage devices, computer software, and other components. A high level block diagram of such a computing device is shown in FIG. 5. Computing device 502 contains a processor 504 which controls the overall operation of computing device 502 by executing computer program instructions which define such operation. The computer program instructions can be tangibly stored in a storage medium 512 (e.g., magnetic or optical disk or other computer readable medium now known or to become known) and loaded into memory media 510 or read directly from media 510 when execution of the computer program instructions is desired. Computing device 502 also includes one or more interfaces 506 for communicating with other devices (e.g., locally or via a network). Computing device 502 also includes input/output 508 which represents devices which allow for user interaction with the computing device 502 (e.g., display, keyboard, mouse, speakers, buttons, etc.).

One skilled in the art will recognize that an implementation of an actual computing device will contain other components as well, and that FIG. 5 is a high level representation of some of the components of such a computing device for illustrative purposes, which may be, for example, a personal computer, PDA, wireless device, internet appliance, cellular telephone, or such processor driven technology. In addition, the processing steps described herein can also be implemented using dedicated hardware, the circuitry of which is configured specifically for implementing such processing steps. Alternatively, the processing steps can be implemented using various combinations of hardware, firmware and software.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the first or second computers or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
 analyzing, by a processor, each digital photograph in a plurality of digital photographs to obtain one or more items of metadata related to the each digital photograph;
 analyzing each digital photograph to obtain photograph content information related to the each digital photograph, the analyzing of each digital photograph further comprising performing image recognition on the each digital photograph to obtain said photograph content information, the photograph content information comprising a particular person's face;
 analyzing, by the processor, the metadata items related to the each digital photograph;
 automatically organizing, by the processor, the plurality of digital photographs into clusters,
 each cluster associated with at least one cluster parameter and the photograph content information, each cluster parameter related to a metadata item, the at least one cluster parameter comprising a maximum number of digital photographs for the corresponding cluster;

determining, by the processor, whether the corresponding cluster contains more digital photographs than the maximum number of digital photographs for the corresponding cluster;

when the corresponding cluster contains more digital photographs than the maximum number, dividing, by the processor, the corresponding cluster into two or more clusters having additional cluster parameters;

causing, by the processor, the digital photographs organized into the clusters to be displayed on a display of a computing device in accordance with the at least one cluster parameter;

after the organizing and causing to display steps, receiving, by the processor from a user operating the computing device, additional metadata items related to one or more of the plurality of digital photographs; and reorganizing, by the processor, one or more of the digital photographs into a different cluster based on the additional metadata items.

2. The method of claim 1 wherein the analyzing each digital photograph in the plurality to obtain one or more items of metadata related to the each digital photograph further comprises analyzing each digital photograph in the plurality to obtain one or more of date, time that the digital photograph is stored on the processor, time taken, and event.

3. The method of claim 1 wherein the analyzing each digital photograph to obtain one or more items of metadata further comprises analyzing each digital photograph to obtain a location associated with the each digital photograph.

4. The method of claim 1 further comprising obtaining the plurality of digital photographs.

5. The method of claim 4 wherein the obtaining a plurality of digital photographs further comprises receiving the plurality of digital photographs from a digital camera.

6. The method of claim 1 further comprising receiving instructions to move a digital photograph from one cluster to another cluster.

7. The method of claim 1 further comprising receiving instructions to form a new cluster.

8. The method of claim 7 further comprising receiving instructions to organize a digital photograph into the new cluster.

9. The method of claim 1 further comprising receiving instructions to rearrange a cluster.

10. The method of claim 1 wherein the causing the digital photographs organized into the clusters to be displayed further comprises transmitting thumbnails of the digital photographs to the computing device.

11. A non-transitory computer readable storage medium storing computer program instructions capable of being executed by a computer processor, the computer program instructions defining the steps of:

analyzing each digital photograph in a plurality of digital photographs to obtain one or more items of metadata related to the each digital photograph;

analyzing each digital photograph to obtain photograph content information related to the each digital photograph, the analyzing of each digital photograph further comprising performing image recognition on the each digital photograph to obtain said photograph content information, the photograph content information comprising a particular person's face;

analyzing the metadata items related to the each digital photograph;

automatically organizing the plurality of digital photographs into clusters,
each cluster associated with at least one cluster parameter and the photograph content information,
each cluster parameter related to a metadata item, the at least one cluster parameter comprising a maximum number of digital photographs for the corresponding cluster;

determining whether the corresponding cluster contains more digital photographs than the maximum number of digital photographs for the corresponding cluster;

when the corresponding cluster contains more digital photographs than the maximum number, dividing the corresponding cluster into two or more clusters having additional cluster parameters;

causing the digital photographs organized into the clusters to be displayed on a display of a computing device in accordance with the at least one cluster parameter;

after the organizing and causing to display steps, receiving, from a user operating the computing device, additional metadata items related to one or more of the plurality of digital photographs; and reorganizing, by the processor, one or more of the digital photographs into a different cluster based on the additional metadata items.

12. The non-transitory computer readable storage medium of claim 11 wherein the computer program instructions defining the step of analyzing each digital photograph in the plurality to obtain one or more items of metadata related to the each digital photograph further comprises computer program instructions defining the step of analyzing each digital photograph in the plurality to obtain one or more of date, time that the digital photograph is stored on the computer processor, time taken, and event.

13. The non-transitory computer readable storage medium of claim 11 wherein the computer program instructions defining the step of analyzing each digital photograph to obtain one or more items of metadata further comprises computer program instructions defining the step of analyzing each digital photograph to obtain a location associated with the each digital photograph.

14. The non-transitory computer readable storage medium of claim 11 further comprising computer program instructions defining the step of obtaining the plurality of digital photographs.

15. The non-transitory computer readable storage medium of claim 11 further comprising computer program instructions defining the step of receiving instructions to move a digital photograph from one cluster to another cluster.

16. The non-transitory computer readable storage medium of claim 11 further comprising computer program instructions defining the step of receiving instructions to form a new cluster.

17. The non-transitory computer readable storage medium of claim 16 further comprising computer program instructions defining the step of receiving instructions to organize a digital photograph into the new cluster.

18. The non-transitory computer readable storage medium of claim 11 further comprising computer program instructions defining the step of receiving instructions to rearrange a cluster.

* * * * *